(12) United States Patent
Willinger

(10) Patent No.: US 6,837,037 B2
(45) Date of Patent: Jan. 4, 2005

(54) INTERCONNECTED RUBBER RING CHAIN

(76) Inventor: Jonathan Willinger, c/o JW Pet Company, Inc. 1 United La., Teterboro, NJ (US) 07608

( * ) Notice: Subject to any disclaimer, the term of this patent is extended or adjusted under 35 U.S.C. 154(b) by 0 days.

(21) Appl. No.: 10/390,209

(22) Filed: Mar. 17, 2003

(65) Prior Publication Data

US 2004/0139720 A1 Jul. 22, 2004

Related U.S. Application Data

(60) Provisional application No. 60/441,694, filed on Jan. 22, 2003.

(51) Int. Cl.$^7$ ................................................ F16G 13/06
(52) U.S. Cl. ..................... 59/85; 59/1; 59/3; 59/35.1; 59/78; 59/84
(58) Field of Search ......................... 59/1, 3, 35.1, 78, 59/84, 85, 90

(56) References Cited

U.S. PATENT DOCUMENTS

| | | | | |
|---|---|---|---|---|
| 2,051,653 A | * | 8/1936 | Rich | 59/85 |
| 2,292,637 A | * | 8/1942 | Hendrickson | 59/35.1 |
| 2,399,855 A | * | 5/1946 | Cobb | 59/90 |
| 2,771,768 A | * | 11/1956 | Tudor | 59/85 |
| 2,840,983 A | * | 7/1958 | Keilbach | 59/83 |
| 3,153,898 A | * | 10/1964 | Gerhardt | 59/84 |
| 3,418,803 A | * | 12/1968 | Martin | 59/35.1 |
| 3,453,823 A | * | 7/1969 | Mundt | 59/90 |
| 3,507,112 A | * | 4/1970 | Nelson | 59/84 |
| 3,662,539 A | * | 5/1972 | Florjancic | 59/80 |
| 3,707,021 A | * | 12/1972 | Norrman | 59/85 |
| 4,673,015 A | * | 6/1987 | Andreasson | 59/78 |
| D308,082 S | * | 5/1990 | Raiffe | D21/408 |
| D326,120 S | * | 5/1992 | Michaelson et al. | D21/479 |
| 6,256,974 B1 | * | 7/2001 | Shanks, Sr. | 59/85 |

* cited by examiner

Primary Examiner—David Jones
(74) Attorney, Agent, or Firm—Katten Muchin Zavis Rosenman

(57) ABSTRACT

A chain formed by interconnecting rubber rings of the same or various shapes. The rings are either solid or non-solid and are interconnected such that the individual rings are moveable relative to each other and yet are substantially inseparable.

18 Claims, 4 Drawing Sheets

INTERCONNECTED RUBBER RING CHAIN

CROSS-REFERENCE TO RELATED APPLICATION

This application claims priority under 35 U.S.C. §119(e) from U.S. provisional application 60/441,694 filed Jan. 22, 2003.

FIELD OF THE INVENTION

The present invention relates to ring toys in general, and more specifically to an interconnected rubber ring chain toy for use by pets and their owners.

BACKGROUND OF THE INVENTION

Rubber rings of a diameter of one-quarter inches or more are well known in the field of pet toys. However, the present inventor is not aware of a pet toy comprising a series of two or more rubber objects or rings connected by looping one inside the other in order to create a chain effect.

SUMMARY OF THE INVENTION

An interconnected rubber ring chain comprises a first rubber ring having a first shape and a second rubber ring having a second shape and interconnected with said first rubber ring such that said first and second rubber rings are both movable and substantially inseparable relative to each other. Each ring may be solid (continuous) or non-solid (discontinuous) such that the rings may be interconnected by mechanical or non-mechanical methods. A chain may be formed from rings having the same or various shapes.

DETAILED DESCRIPTION OF THE PREFERRED EMBODIMENTS

Figure 1:
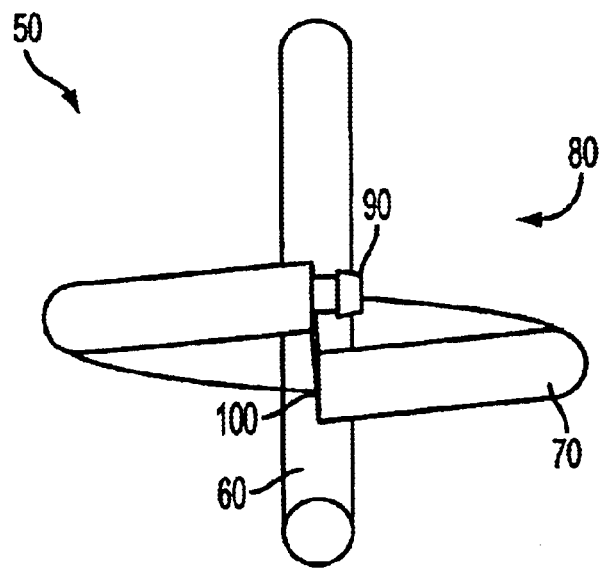
FIG. 1 illustrates pair of rings used to form a chain in accordance with the teachings of the present invention.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

FIG. 1 illustrates a first embodiment of a chain 50 of the invention having a first solid or continuous ring 60 interconnected with a second non-solid, segmented or discontinuous ring 70. The second ring 70 is provided with a joint 80 having a first "male" part 90 and a second "female" part 100 that are joined together to secure the second ring 70 to the first ring 60, such that the rings 60, 70 are movable relative to each other yet substantially inseparable from each other. Each ring 60, 70 has a round or circular shape, although other shapes are contemplated. For purposes of explanation, the term "ring" as used herein will be understood to mean a continuous-loop object, it being understood that the term "ring" shall not be limited to an annular, toroidal shape. Also, while certain rings may be illustrated herein with round cross-sections, such cross-section can be any shape, and may have a thickness that is solid or hollow, tubular. In addition, such rings may be any size and are preferably formed from rubber.

In FIG. 1, the second ring 70 is looped through the first ring 60 and then the joint part 90 is inserted into the joint part 100 to attach or otherwise secure the second ring 70 relative to the first ring 60. Although not necessary, an adhesive (not shown) may be used to secure the joint 80, with cyanoacrylates known to be very effective in gluing rubber. If an adhesive is used, the opening 100 would preferably be notched to better support a glue joint. A notch can be created so that the second ring 70 will not come apart even under tremendous pull tension and even if an adhesive is not used. The adhesive, if used, is preferably applied all around the notch in order to maximize the adhesion area. The glued joint 80 creates the appearance of a groove (see FIGS. 2 and 4 discussed below) in the second ring 70. The resultant chain 50 formed by the plurality of rings 60, 70 could be used for tug-of-war and other amusements with one's pet. Of course, any number of rings may be looped together to form a chain as long as such number is preferably greater than one.

Figure 2:
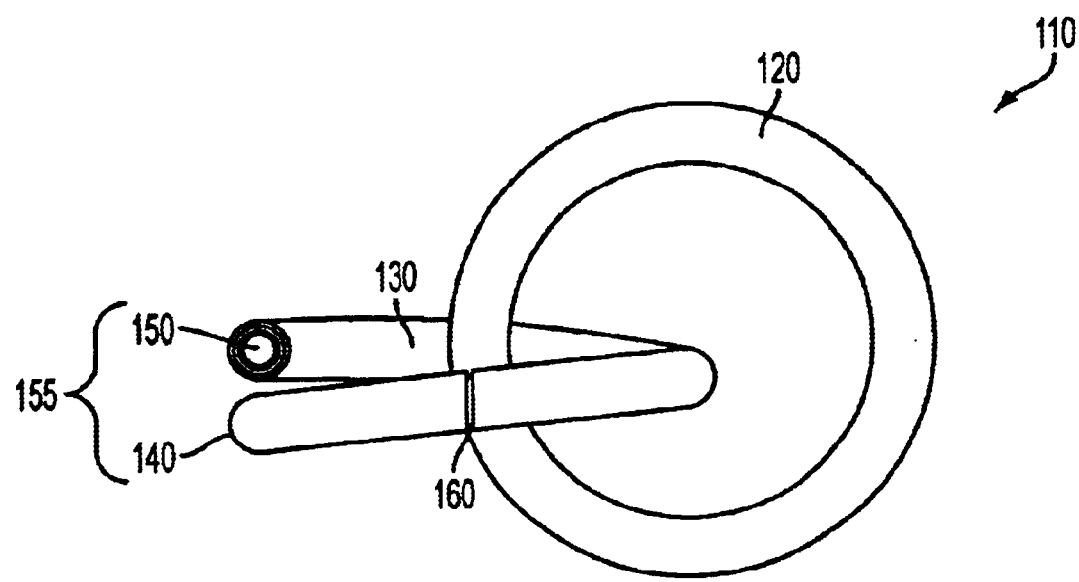
FIG. 2 illustrates an alternative embodiment of a pair of rings used to form a chain of the invention.
Figure 3:
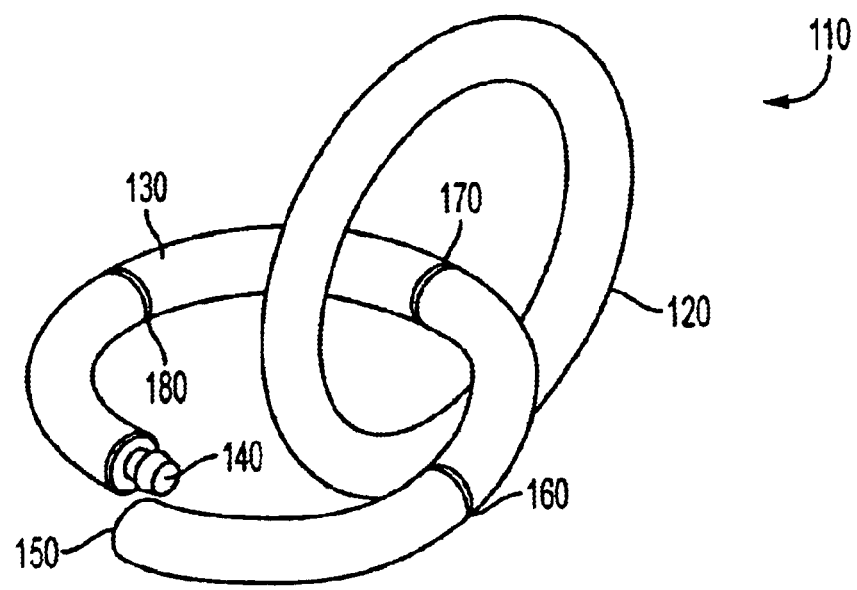
FIG. 3 illustrates a series of grooves provided on one of the rings shown in FIG. 2.
Figure 5:
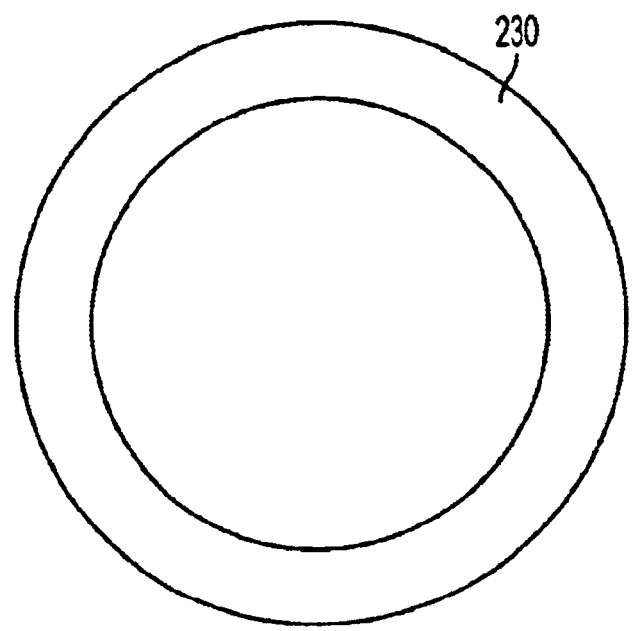
FIG. 5 illustrates a ring used to form a chain in accordance with an alternative embodiment of the present invention.
Figure 4:
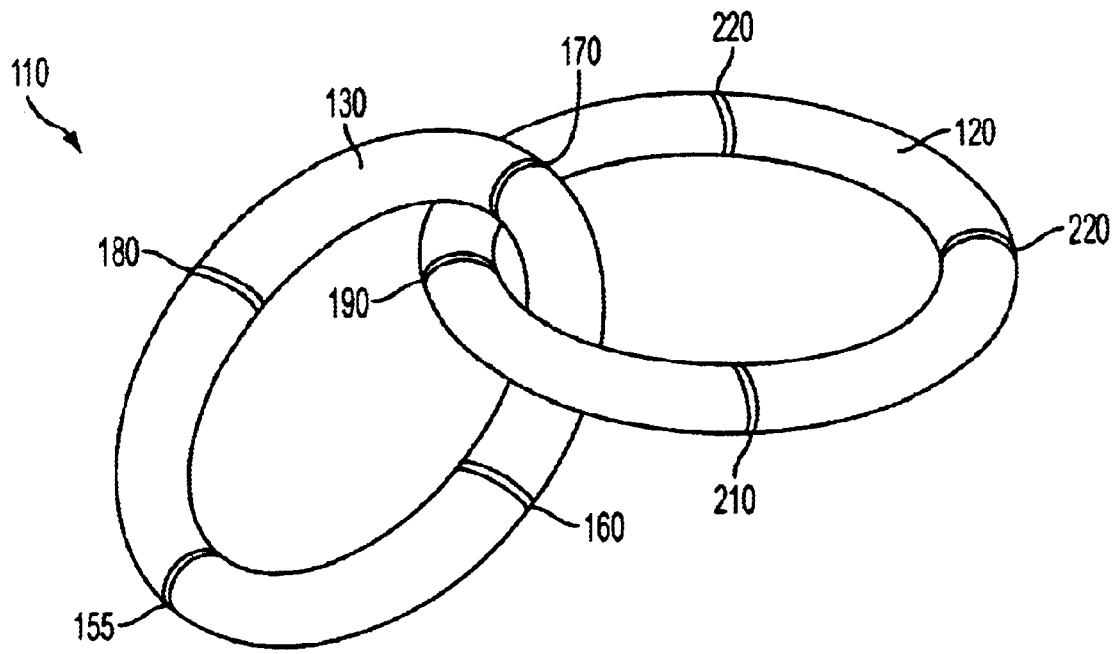
FIG. 4 illustrates the use of grooves on both rings shown in FIG. 2.
Figure 8:
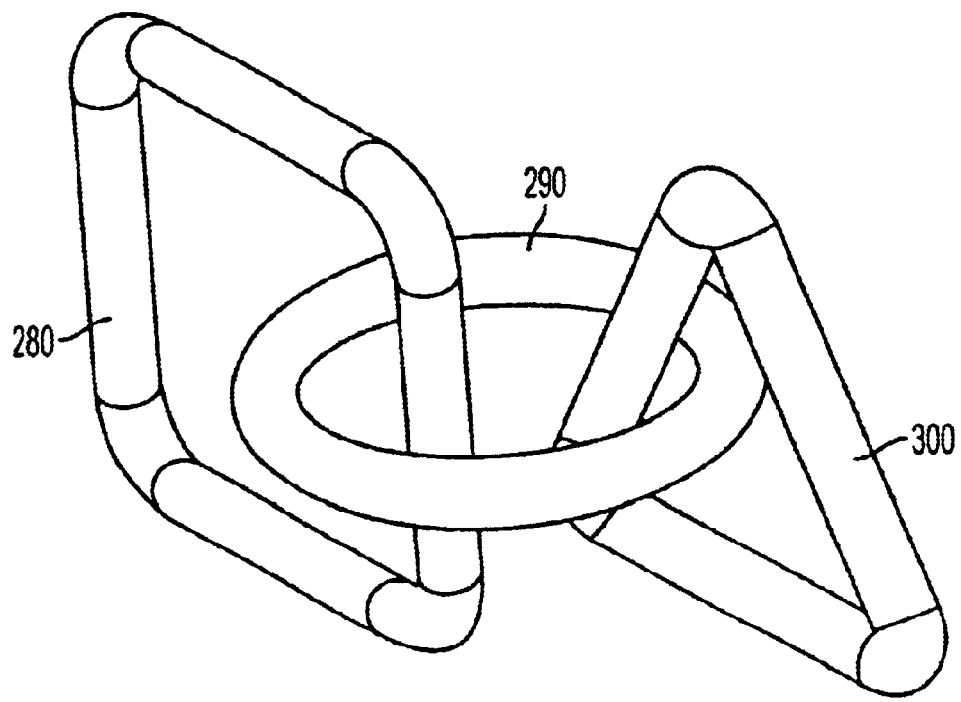
FIG. 8 illustrates an alternative embodiment of a chain of the invention.

FIGS. 2–4 illustrate an alternative embodiment of a chain 110 of the invention having a first solid or continuous ring 120 and a second non-solid or discontinuous ring 130 looped therethrough. The second ring 130 has first joint part 140 and a second joint part 150 that are joined together to form a joint 155 (FIG. 4) in the same manner as illustrated in FIG. 1. Because the joinder of the joint parts 140, 150 creates a joint 155 (FIG. 4) having a grooved appearance, one groove 160 (FIG. 2) or multiple grooves 160, 170, 180 (FIG. 3) are preferably fashioned into the outer periphery of the second ring 130 to camouflage the grooved appearance created by the joint 155. Similarly, a series of indentations or grooves 190, 200, 210, 220 can be created in the first ring 120 (FIG. 4) so that the solid and non-solid rings 120, 130 look the same. Such grooves may be spaced around the outer periphery of the rings in a random, uniform and/or equidistant pattern. Again, the rings may be completely round as shown in FIGS. 1–3, or may be formed from other shapes as shown later in connection with FIG. 8.

FIGS. 5–8 illustrate a further embodiment of the present invention, wherein a series of two or more rubber objects or rings are interconnected without utilizing glue or other mechanical bonding. Such embodiment relates to the use of insert molding natural rubber to create a chain 270 of rubber rings or objects.

Figure 6:
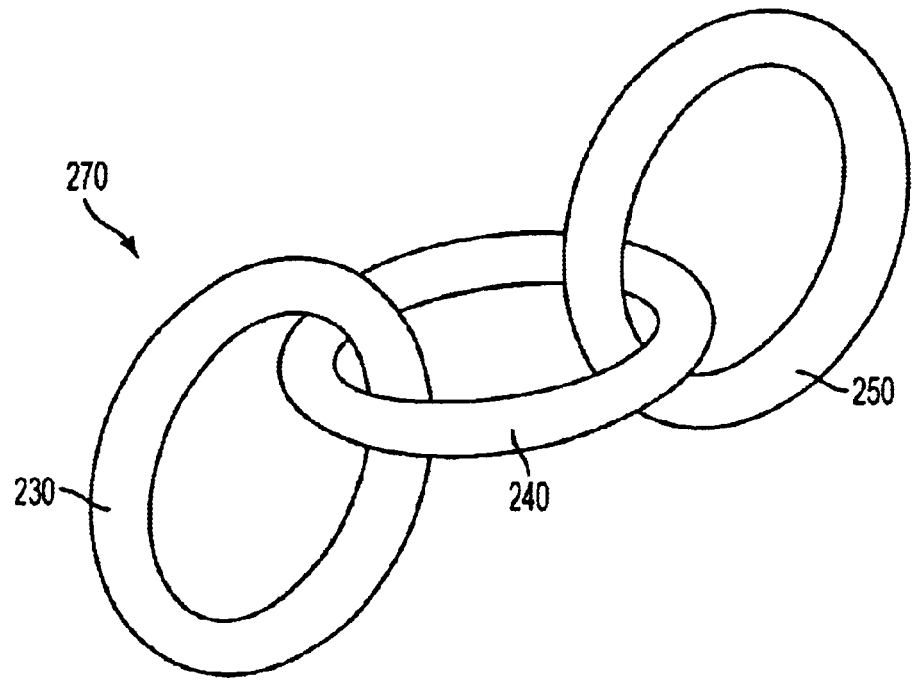
FIG. 6 illustrates a chain formed from a plurality of rings in accordance with the invention.
Figure 7:
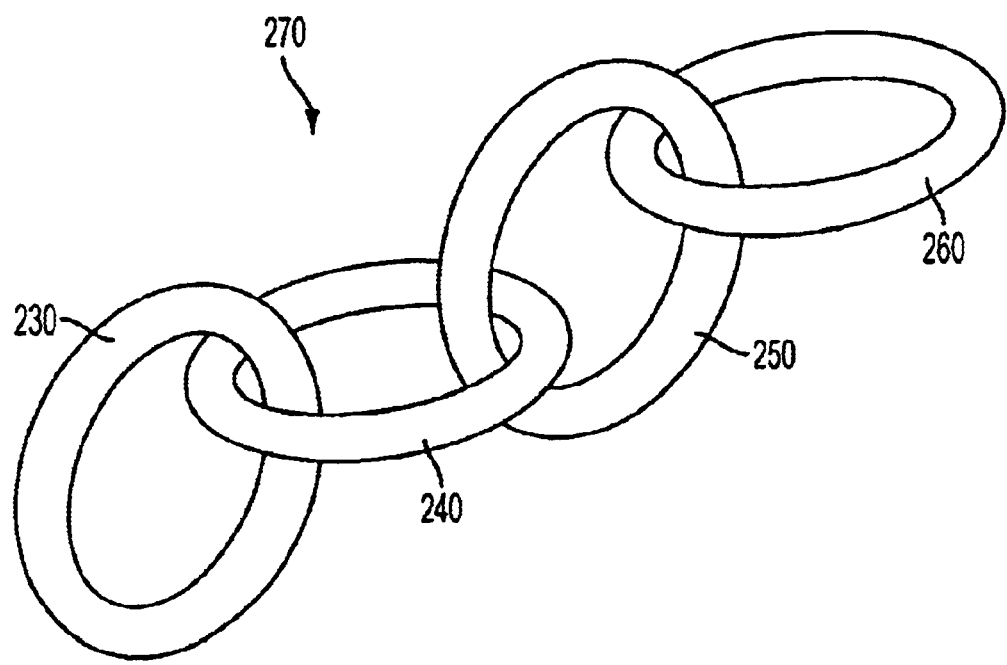
FIG. 7 illustrates an alternative embodiment of a chain of the invention.

First, one ring 230 is molded (FIG. 5) using means known in the art. Then, the molded ring 230 is placed in a second mold where another ring 240 is then molded so that the second ring 240 runs through the center of the first ring 230 (FIG. 6). This process can then be repeated to create a chain 270 formed from a plurality of looped rings 230, 240, 250, 260 (FIGS. 6 and 7). In this way a substantially unbreakable, non-tearing chain 270 of rubber rings is created. Other shaped rings 280, 290, 300 (FIG. 8) that are both round and polygonal could also be used and created through such interlocking method, all without utilizing adhesive or other mechanical means of locking. In this manner a more versatile dog toy is created, one that can be used a tug or a chew toy by a pet.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

I claim:

1. An interconnected natural rubber ring chain adapted for oral contact comprising:
   a) a first natural rubber ring having a first shape, and
   b) a second natural rubber ring having a second shape and interconnected with said first natural rubber ring in a looped fashion such that said first and second natural rubber rings are both independently movable and substantially inseparable relative to each other,
   c) wherein said second natural rubber ring is attached around said first natural rubber ring by insert molding such that said first natural rubber ring is molded in a first mold and then inserted into a second mold whereby said second natural rubber ring is molded around said molded first natural rubber ring.

2. An interconnected natural rubber chain in accordance with claim 1, wherein said first and second shapes are the same.

3. An interconnected natural rubber ring chain in accordance with claim 1, wherein said first and second shapes are different.

4. An interconnected natural rubber ring chain in accordance with claim 1, wherein at least one of said rings has a series of grooves or indentations.

5. An interconnected rubber ring chain, comprising:
   a) a first rubber ring having a first shape, and
   b) a second rubber ring having a second shape and interconnected with said first rubber ring in a looped fashion such that said first and second rubber rings are both independently movable and substantially inseparable relative to each other,
   c) wherein said second rubber ring is attached around said first rubber ring, and
   d) wherein said second rubber ring is segmented and further comprises a joint having a first part and a second part that are adhesively joined to create a substantially unbreakable solid ring.

6. An interconnected rubber ring chain in accordance with claim 5, wherein said joint is adhered with a cyanoacrylate.

7. An interconnected rubber ring chain in accordance with claim 6, wherein one of said parts is notched to facilitate the adhesive joinder of the first and second parts.

8. An interconnected rubber ring chain, comprising:
   a) a first rubber ring having a first shape, and
   b) a second rubber ring having a second shape and interconnected with said first rubber ring in a looped fashion such that said first and second rubber rings are both independently movable and substantially inseparable relative to each other,
   c) wherein said second rubber ring is attached around said first rubber ring, and
   d) wherein said second rubber ring is discontinuous and further comprises a joint having a first part and a second part that are non-adhesively joined to create a substantially unbreakable solid ring.

9. An interconnected natural rubber ring chain in accordance with claim 1, wherein one of said first and second natural rubber rings is solid and continuous and the other is segmented.

10. An interconnected natural rubber ring chain in accordance with claim 1, wherein at least one of said rings is segmented.

11. An interconnected rubber ring chain, comprising:
    a) a first rubber ring having a first shape, and
    b) a second rubber ring having a second shape and interconnected with said first rubber ring in a looped fashion such that said first and second rubber rings are both independently movable and substantially inseparable relative to each other,
    c) wherein at least one of said rings is segmented, and
    d) wherein said segmented rubber ring further comprises at least one joint having a grooved appearance and at least one other groove that does not constitute a joint but that visually resembles the grooved appearance of the joint.

12. An interconnected rubber ring chain in accordance with claim 11, further comprising a plurality of other grooves.

13. An interconnected rubber ring in accordance with claim 12, wherein said joint and plurality of other grooves are equally spaced around said segmented rubber ring.

14. An interconnected natural rubber ring chain in accordance with claim 1, wherein at least one said first and second shapes is completely round.

15. An interconnected natural rubber ring chain in accordance with claim 1, wherein at least of said first and second shapes is a polygon.

16. An interconnected rubber ring chain, comprising:
    a) a first rubber ring having a first shape, and
    b) a second rubber ring having a second shape and interconnected with said first rubber ring in a looped fashion such that said first and second rubber rings are both independently movable and substantially inseparable relative to each other,
    c) wherein at least one of said first and second shapes is a polygon, and
    d) wherein at least one said first and second shapes is completely round.

17. An interconnected natural rubber ring chain in accordance with claim 1, further comprising three or more interconnected natural rubber rings, each ring having a different shape.

18. An interconnected natural rubber ring chain in accordance with claim 1, further comprising three or more interconnected natural rubber rings with at least one ring being simultaneously interconnected with at least two other rings.

* * * * *